Dec. 22, 1964  A. ALVAREZ-CALDERON  3,162,402
STABILITY AND CONTROL SYSTEM AND APPARATUS FOR AIRCRAFT
Filed Jan. 12, 1962  3 Sheets-Sheet 1
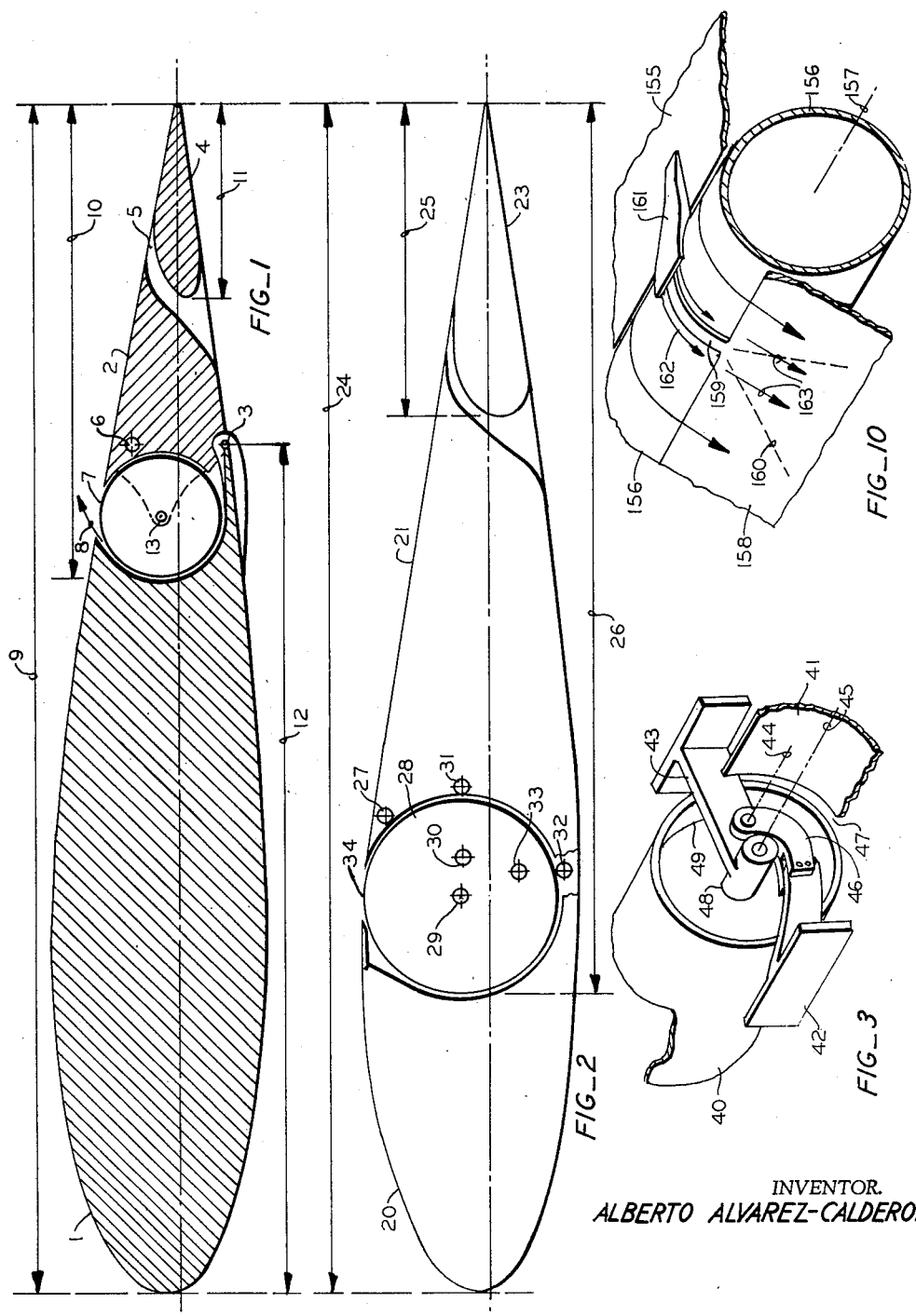
INVENTOR.
ALBERTO ALVAREZ-CALDERON

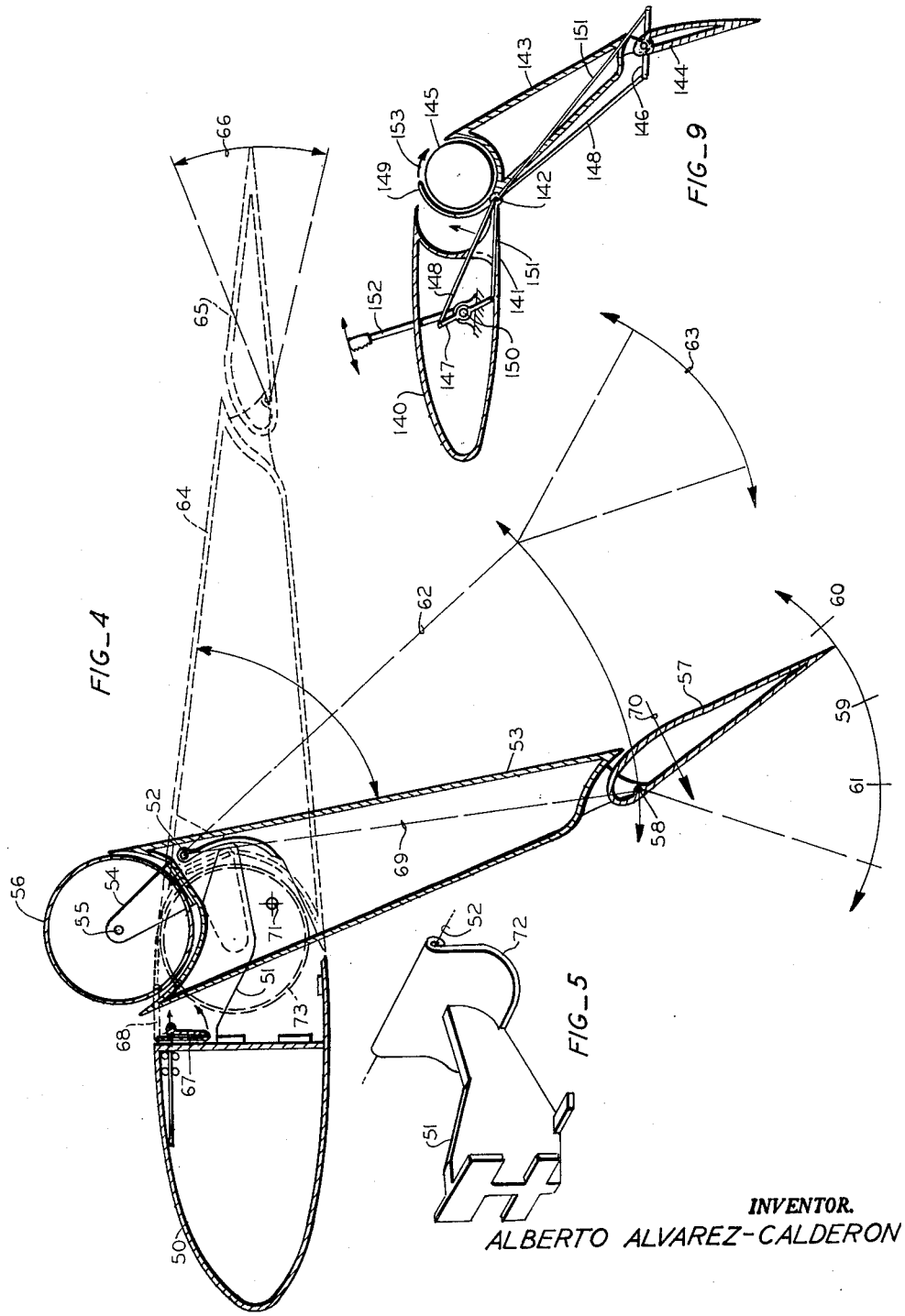

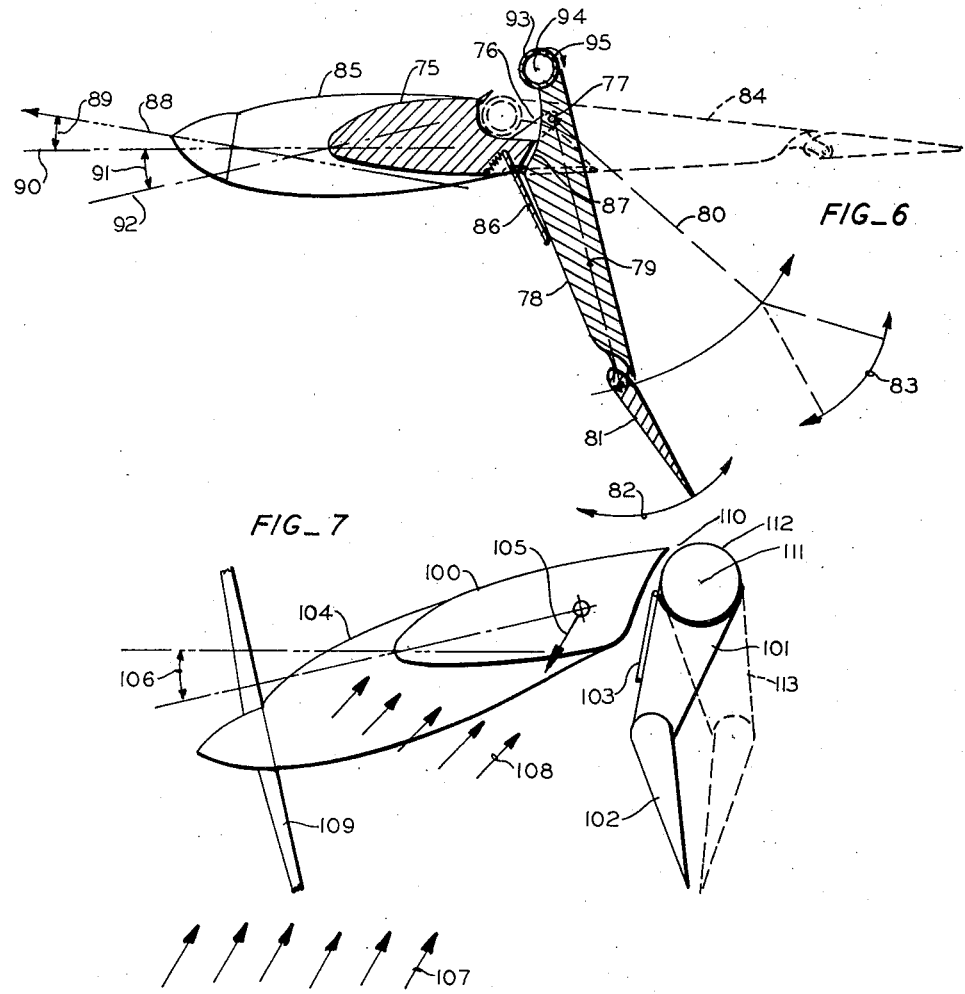

3,162,402
STABILITY AND CONTROL SYSTEM AND
APPARATUS FOR AIRCRAFT
Alberto Alvarez-Calderon, 1560 Castilleja St.,
Palo Alto, Calif.
Filed Jan. 12, 1962, Ser. No. 165,794
6 Claims. (Cl. 244—42)

This invention is related to high lift trailing edge devices for aircraft wings. More particularly, this invention concerns the use of spanwise rotating cylinders and reversible camber flaps to improve the lift and control characteristic of vertical takeoff and landing (VTOL) and short take off and landing (STOL) aircraft.

In my copending application Serial No. 48,038 of August 8, 1960, now Patent 3,092,354, I have disclosed several structures which utilize rotating cylinders and flaps as high lift devices for conventional aircraft wings and for VTOL and STOL aircraft. I have shown the use of aerodynamically balanced and mass balanced flaps having a rotating cylinder or other forms of boundary layer control devices mounted on the leading edge of the flap and with the flap pivoted such as to cause protrusion of the cylinder or other B.L.C. device above the wing when the flap was deflected. I have shown the use of such flaps having flap chords greater than wing chords in order to obtain improved lift and stability characteristics of VTOL and STOL performance. Further, I have shown advantageous configurations suitable for propeller driven deflected slipstream VTOL aircraft characterized in having the wing chord smaller than the flap chord and in having an aerodynamically balanced flap with a large flap chord and with a rotating cylinder mounted on the flap leading edge and projecting substantially completely above the wing for large flap deflections.

These types of configurations were shown to be capable of greatly decreased pitching moments and of exhibiting neutral pitch stability. In this application, I am disclosing improvements of the aforementioned structures and new arrangements for the pitch stability and control VTOL and STOL aircraft by means of variable camber flaps.

It is known that conventional flaps used in combination with aircraft wings have as a purpose to increase the camber of the wing-flap combination in order to increase its lift. Such flaps are usually restricted in flap chord length to about 25 or 30 percent of the wing chord. The flaps produce not only an increment of lift but also a negative pitching moment about the wing quarter chord as well as a negative hinge moment at the flap's hinge support.

In order to produce very high lift suitable for STOL and VTOL operations, there has been proposed in the past the use of flaps having flap chords somewhat greater than the conventional size. These large flaps have been in most cases divided into two smaller flaps of the slotted type both of which were capable of angular displacement with respect to the wing in the same direction; thus, they provide a smoothly curving profile having a variable wing and flap camber line which is curved downwardly in the same direction; that is, the wing and flap camber line is convex in its entire chord length.

One well known example of this type of flap is shown in NACA TR723 describing tests on a 40 percent chord double slotted flap. These large flaps of the general type described produce not only larger lift increments, but also produce large negative pitching moments about the wing quarter chord and large negative flap hinge moments on the flap supports. These moments are known to be undesirable because they introduce problems in pitch stability and control to the aircraft and because they produce large wing torsional stresses and require powerful and heavy flap mechanisms and flap actuators.

As already mentioned, in my aforementioned patent application, I have shown the use of aerodynamically balanced flaps characterized in having a rotating cylinder or other means of boundary layer control at the leading edge of the flap and installed such as to have the flap's leading edge protruding above the wing when the flap was deflected. These types of flaps give the advantages of improved flap load characteristics, and improved pitch stability and control characteristics of aircraft using them including neutral pitch stability of deflected slipstream VTOL aircraft.

I am now prescribing certain very specific proportions for these types of flaps on wings suitable for STOL and VTOL. Furthermore, I am prescribing new variable camber flaps in which the camber can be reversed. In this flap, the flap camber can be changed in a positive or negative direction from a neutral position by means of an auxiliary pivoted portion at the trailing edge of the flap. These reversible camber flaps, when installed according to the arrangements shown in my application Serial 48,038 such that when the flap camber is in its neutral position the flap exhibits aerodynamic balance with the flap deflected, can be used to provide pitching moment variation for pitch control by varying the flap camber itself for a given flap deflection. For instance, if a deflected slipstream VTOL is hovering with neutral stability with a reversible-camber aerodynamically balanced rotating cylinder flap deflected at 80 degrees and the flap camber line and its auxiliary surface at a neutral position, then decreasing the flap's camber by moving the auxiliary surface upwards (producing an upward concavity in the flap like in FIGURE 4) introduces a pitch up on the airplane, conversely introducing positive camber in the flap produces a nosed down pitch condition. (In order to avoid confusion between the main flap and the auxiliary flap, the latter will be referred to as flapevator insofar as it is located on a wing as a conventional flap but yet is can perform the function of the elevator in a conventional tail.)

Furthermore, my variable camber flaps can be used for large lift increments with greatly reduced pitching moments and flap hinge moments even without full aerodynamic balance in the flap by having the flap chord of a proper dimension and using boundary layer control to permit very large flap deflections with attached flows on the upper surface of the flap. In these arrangements, see, for instance, FIGURE 8, a large flap chord is advantageous to obtain a large lift increment due to flap size and to locate the negative pressure peak of the flap forward towards the center of gravity (C.G.) region of the wing chord. The C.G. location of VTOL and STOL may extend from 26% to 35% of the wing chord, approximately. Boundary layer control is advantageous to fully realize the attached flap flows and large lift increments with the large main flap deflected by large angles, even though the rear portion of the flap is turned upwards to decrease the overall lift. This upward turning, however, serves to decrease strongly the flap hinge moments and the wing pitching moments.

Summarizing the characteristics of an airfoil having my reversible camber flap, it is observed that the structure prescribed permits the use of a variable camber airfoil which can assume an S-shaped camber line. This airfoil, when constructed in the proper proportions and with the aid of boundary layer control, produces large lift increments with vastly improved flap and wing moment characteristics. Phrased differently, there is obtained a variable camber airfoil with a camber line having two inflection points in its length. This produces a highly flapped reflexed airfoil section when the flap is deflected. The proportions of the flap are shown to be large compared to standard flaps, and boundary layer control should be installed at the bend of the main flap in order to permit large main flap deflections to produce large lift increments with reduced flap and wing moments.

A point of distinction should be made between my reversible camber VTOL/STOL flaps and the conventional servotabs for conventional control surfaces, for example, see "Principles of Aerodynamics," by Dwinell, figure 15.25, page 352, 1949 edition.

Conventional flaps or control surfaces with tabs are aerodynamically inadequate for VTOL/STOL wings because their deflection range with attached flap flows in very small and of the order of 20 degrees which is insufficient for VTOL and STOL, because the tabs cannot be reversed in either direction for any flap deflection, because with the tab parallel to the flap's camber line such flaps will obviously not exhibit any flap aerodynamic balance, and because the negative pressure peak of such flap is located too far to the rear of the aircraft center of gravity location, thereby producing relatively large negative pitching moments.

With my reversible camber flaps constructed with the appropriate proportions and with boundary layer control on the flap, there has been obtained a deflected slipstream VTOL and STOL configuration which has exhibited in model experiments neutral pitch stability and very satisfactory pitch controllability in hover, backward flight and forward transition without the use of tail controls. Such results are not obtainable from the use of conventional flaps and tabs.

It is a purpose of this invention to provide apparatus for pitch control of aircraft that have improved flaps and improved pitch stability characteristics.

Yet one more purpose of this invention is to provide flap apparatus to permit variation of flap camber with flap position, or at will of a pilot independent of flap position.

Another object of this invention is to provide reversible camber flaps in which boundary layer control is used at the leading edge of the flap.

One more object of this invention is to provide reversible camber flaps in which a rotating cylinder is mounted at the leading edge of the flap.

Yet one more object of this invention is to diminish flap hinge moments of deflected slipstream VTOL and STOL aircraft by the use of pivoted auxiliary portions on a flap which auxiliary portions can be turned with respect to the flap in a direction opposite to that of the flap's deflection.

One more object of this invention is to provide pitch control of deflected slipstream VTOL and STOL aircraft through variations and reversals of the camber of a large flap.

Yet one more object of this invention is to provide structure for a variable camber airfoil the camber line of which is S-shaped and in which boundary layer control is provided at the forward bend of the S.

Yet another object of this invention is to provide a reversible camber flap, which flap is aerodynamically balanced for a neutral flap camber position.

One more object of this invention is to provide reversible camber flaps with boundary layer control installed at the flap's forward bend.

Another object of this invention is to provide a variable camber airfoil and flap which can be deflected in peculiar configurations suitable for steep VTOL and STOL approaches.

Yet one more object of this invention is to provide aerodynamic improvements for rotating cylinder flaps in the area of the cylinder's supports.

These and other objects of this invention will become more readily apparent from a perusal of the description of the various embodiments illustrated in the drawings, in which:

FIGURE 1 shows a cross-section of a high lift airfoil suitable for STOL having a rotating cylinder and a plain flap having a main flap portion and an auxiliary flap. The drawing specifies certain important dimensions and flap hinge locations.

FIGURE 2 shows the cross-section of a radical airfoil configuration suitable for deflected slipstream VTOL aircraft. The drawing shows a reversible camber flap having a main flap portion and an auxiliary flap for pitch control. It also specifies certain important dimensions and flap hinge line locations.

FIGURE 3 shows in perspective view a flap and cylinder support bracket in which the flap hinge axis is within the cylinder as suggested by one of the hinge line locations shown in FIGURE 2.

FIGURE 4 shows the cross-section of a VTOL airfoil of the type described in FIGURE 2, with the flap deflected and the pitch control surface inclined to the main flap surface to produce a pitch up condition. The drawing specifies one type of structure to permit a special flap hinge line location also shown in FIGURE 2.

FIGURE 5 shows in perspective the flap support bracket of FIGURE 4.

FIGURE 6 shows the cross-section of a deflected slipstream VTOL flap using blowing boundary layer control and having an auxiliary type of flap for pitch control. It also specifies certain details of thrust line inclination to the wind and wing incidence in the fuselage.

FIGURE 7 shows a cross-section of a V/STOL airfoil section using its variable camber rotating cylinder flap to obtain a steep landing approach.

FIGURE 8 shows a VTOL/STOL section with reversible camber in a position suitable for transition to high speed flight and for a STOL takeoff maneuver.

FIGURE 9 shows a mechanism to control the camber position of my reversible camber flaps.

FIGURE 10 shows a small nozzle installed at the bearing support between adjacent ends of rotating cylinders, which nozzle serves to improve the flow deteriorations caused by the bearing support.

With initial reference to FIGURE 1 there is shown the cross-section of high lift airfoil suitable for STOL having a rotating cylinder mounted on the leading edge of a flap, and an auxiliary flap. The flaps are shown in their high speed retracted condition. Specifically, it is shown a medium thick airfoil 1 similar to the NACA 23018 having a 40 percent chord main flap 2 mounted on the wing by means of a flap bracket at flap hinge axis 3. The flap has mounted on its leading edge a cylinder 7 by means of bracket 13. The flap is shown having an auxiliary slotted trailing edge flap 4 shown in its neutral position.

Wind tunnel tests of this airfoil have shown that with the cylinder rotating such that its peripheral speed was larger than the remote tunnel speed and with the main flap deflected 60 degrees and the auxilairy surface neutral, section lift coefficients of over four can be obtained. The maximum section lift coefficients with the cylinder stationary and the flap and the flap retracted was 1.3. A tremendous lift increment is shown. Furthermore, it was found that with the cylinder rotating the section pitching moments were only —0.50 which is relatively small for the large values of lift coefficients measured, and the section lift-drag ratios were considerably larger with the flap deflected and the cylinder rotating than with the flap undeflected and the cylinder stationary. As can be seen, the aerodynamic characteristics of this section are excellent for STOL application as well as for conventional aircraft having large flaps.

The specific proportions of the airfoil tested are as follows, in terms of the wing chord C shown as 9 in FIGURE 1. Flap chord 10 is 0.40C. Auxiliary flap chord 11 is 0.16C. Gap 5 is 0.015C. Cylinder diameter is 0.11C. Flap pivot axis is located at distance 12, from the wing leading edge. Flap axis 3 produced a protrusion of the cylinder's surface above the wind. The cylinder protrusion varies with the sine of the flap deflection angle. Also shown in FIGURE 1 is alternate flap hinge line 6 which greatly reduces the flap hinge moments and section pitching moments of the aforementioned tests. Hinge line 6 is seen to be near the upper surface of the flap and to the rear of the cylinder's surface.

In FIGURE 2, I show an airfoil profile for VTOL and STOL aircraft. The profile is shown in the high speed flap retracted condition and includes a forward wing portion 20, a main flap portion 21 with a rotating cylinder 34 mounted at the leading edge of portion 21, and auxiliary flap 23 at the trailing edge of 21. Auxiliary flap 23 may be a conventional slotted flap or aileron and serve to provide a reversible camber on the flap as will be shown later. The main flap portion 21 is mounted on the wing by means of flap brackets (brackets not shown in this figure but on subsequent figures) such that the flap is a simple pivoted flap. The alternate flap hinge line locations specified are shown in the figure as 27 and 29 to 33. Since this figure has been drawn carefully, the various hinge line locations may be determined in percent of the wing chord or of the flap by measurements in the figure itself. The proportions of one of the models tested is as follows: Wing chord 24 was 18 inches, flap chord 26 was 13.5 inches, auxiliary flap chord 25 was 4.65 inches, airfoil cross-section was an NACA 25118 portion faired into straight upper surfaces from the cylinder to the trailing edge. The cylinder tested was a 3-inch diameter. Flap deflections tested with attached flap flows were from zero to 100 degrees and auxiliary flap deflections with respect to the main flap were plus or minus 25 degrees for all flap positions.

These and other features and characteristics of the structure of FIGURE 2 will be shown more clearly in the structures of the following figures.

In FIGURE 3, I show two supports brackets, one to pivotally support the flap from the wing, and the other to support the cylinder on the leading edge of the flap. The flap's pivot axis is inside the cylinder, as shown also by axis 30 or 33 in FIGURE 2. Specifically, it is shown in FIGURE 3 a wing-supported flap bracket 42 extending from a wing spar (wing spar not shown) into the cylinder and supporting part of a flap structure at flap pivot axis 44 which connects bracket 42 to cylinder bracket 43. Cylinder bracket 43 is supported by a flap spar (flap spar has been omitted from the drawing). Cylinder bracket 43 supports cylinders 40 and 41 at the leading edge of a flap and at cylinder axis 45.

It should be observed that both brackets 42 and 43 are constructed with a relatively thin cross-section near the periphery of the cylinder to permit a narrow gap 47 between the adjacent ends of cylinders 40 and 41. Nevertheless, inside the cylinder's periphery, the bracket can have a larger cross-section as shown by hinge supports 46 and bearing support 48. Cylinder 40 is shown constructed out of a thin metallic shell which may be aluminum or titanium, which shell is supported by bulkhead 49 to bearing 48. An alternate type of construction for the cylinder would be a centric relatively thin shaft with an external concentric styrofoam cylinder to give the required external diameter. I have made tests in which styrofoam discs of 12-inch diameters are rotated at 5000 r.p.m. The tests show that the styrofoam discs can sustain high peripheral speeds without damage.

In FIGURE 4, I show an airfoil cross-section suitable for deflected slipstream VTOL aircraft which exhibit neutral stability characteristics in hover and transition, and controllability in pitch in hover and transition without any tail controls. The proportions, deflections, and flap hinge line locations are those used in model experiments and are of importance as they do prescribe the aerodynamic characteristics of the configuration.

Specifically there is shown a forward wing portion 50 having a flap support bracket 51 which supports the flap at spanwise pivotal axis 52. Flap support axis 52 is located near the top of the wing's surface to prevent backward motion of the cylinder with flap deflection and to maximize the amount of cylinder protrusion. Flap support bracket 51 is also shown in perspective in FIGURE 5.

The figure shows flap 53 having cylinder brackets 54 which support rotating cylinder 56 at cylinder axis 55. The cylinder is seen to protrude substantially completely above the wing for large flap deflections. It is also seen that the amount of cylinder exposure varies with flap deflection, decreasing as the flap is retracted. This feature results in substantial aerodynamic balance for all flap positions.

Flap 53 is constructed to have a reversible camber by means of an auxiliary pivoted trailing surface 57 pivoted as a conventional slotted flap or aileron at axis 58.

For any main flap position, the auxiliary flap 57 may be displaced in either direction with respect to the main flap. For instance, as shown in the drawing for flap position 69, the auxiliary surface 57 may have angular positions 59, 60, or 61.

With the flap 57 in its neutral position 59, it is observed that the auxiliary flap forms a continuation of the main flap 53 and in that case the proportions of the structure correspond very closely to that shown in FIGURE 5 of my aforementioned application Ser. No. 48,038. Thus, the structure is of the type that exhibits flap aerodynamic balance and neutral pitch stability.

With position 59 exhibiting neutral stability, then position 60 would evidently alter the pressure distribution of the profile introducing a localized pressure variation having a resultant force 70 in the direction shown. Such a force produces a pitch up coupled about center of gravity 71, which is located at 35 percent of the wing chord. Conversely, position 61 produces a nose down couple. It then becomes possible to control the pitching moments on an aircraft having substantial neutral stability conditions with its main flap deflected and aerodynamically balanced by introducing a reversible camber to the flaps to provide pitching couples as explained earlier. Insofar as auxiliary surface 57 performs the functions of a normal tail elevator, but is located as a conventional flap, and in order to avoid confusion with the main flap, auxiliary flap 57 will be referred to as the "flapevator." This flapevator is seen to provide pitch control dependent only on attached flap flow, thus in hover a deflected slipstream has pitch control available in the absence of tail jets or forward speed. Further, the control forces are nearly horizontal and they do not affect per se the height control of the aircraft to any large extent. Normal tail jets forces for pitch control on the other hand subtract from net lift.

For transition maneuvers, the flapevator is also very advantageous. For intermediate flap deflections, like flap position 62, the flapevator may be deflected angularly along arc 63 to provide pitch control, and even in flap position 64, movement along arc 66 also provides pitch control. Hover, backward flight and forward transition flights have been performed with a semifree-flight deflected slipstream VTOL model showing that the flapevator, when used in a wing flap combination exhibiting substantial neutral stability with the flapevator neutral for all flap positions, does provide adequate pitch control for these maneuvers. A description of some of these experiments follows:

(a) Model and test apparatus: A deflected slipstream model was constructed substantially as shown in FIGURE 4 with a propeller mounted on a nacelle as shown in FIGURES 6 and 7. The model had the following dimensions: wing span 21 inches, wing chord 4.5 inches excluding flap, flap chord including flapevator and cylinder 13.5 inches, cylinder diameter 3 inches and propeller diameter 20 inches. This model was mounted on a boom with freedom for pitch movement about a 35 percent spanwise pitch axis through the model's center of gravity.

The boom was mounted for rotation about a vertical axis to provide freedom for horizontal translation of the model. The flap was mounted on the wing for pivotal movement about a hinge axis through its center of gravity with flap deflection being controlled by a remote-control wing-mounted servo. The main flap was provided with a flapevator of 4.6-inch chord on its trailing edge. The flapevator could be used for pitch control if desired, by operating it through a flap-mounted servo which was remotely controlled.

(b) Hover tests: The model was operated with propeller and cylinder rotating and with the propeller axis inclined upwardly from the horizontal at an angle of about 5 degrees. The flap was adjusted with the flap servo to a deflection of about 85 degrees with the cylinder protruding above the top surface of the wind by 2.6 inches. With the model free for both horizontal translation and pitch, and with the flapevator fixed in its neutral position, the model remained stationary and did not pitch, indicating that the model had a zero pitching moment and that the net thrust on the model acted vertically. Moving the flapevator with the flap fixed, produced pitch down or pitch up motions of the model, as desired.

(c) Transition tests: In an additional series of tests in which transition to forward flight was investigated by raising the flap to provide forward motion of the model along a horizontal circular path at the end of the boom, the servo controlling flap deflection was operated to adjust the flap deflection with respect to the wing through a plurality of fixed deflection angles between 0 and 90 degrees, and with the model free to pitch the pitching moments on the model were observed to be negligible at all flap deflections. With the flapevator operative, smooth transitions from hover to forward speed back to hover were accomplished under excellent control.

(d) Flap hinge moments: Finally, the model was locked in place against both horizontal translation and pitch movement; the flapevator was left in its neutral position, and the servo was disconnected to permit the flap to pivot freely about its hinge axis under the action of the aerodynamic forces from the slipstream on the flap. By reason of the upward projection of the cylinder on top of the wing, there was obtained an aerodynamically balanced flap at flap deflections of 0 and 70 degrees, with substantially aerodynamic balance for other flap deflections up to 90 degrees. Aerodynamic balance was observed experimentally by observing that the freely pivoted flap stayed deflected at such flap positions which exhibited balance, and barely tended to move in the positions in which substantial aerodynamic balance was obtained. The flap was moved between the several positions manually.

By operating the flapevator with the flap free to pivot as described above, it was possible to deflect and retract the flap smoothly to any desired position. In the above tests, the freedom of motion of the flap and the absence of its motion indicated that the flap hinge moments were zero.

It is of importance to observe that the performance characteristics described in sections (b), (c), and (d) above were exhibited only if the rotating cylinder was operative. With the cylinder stopped, large negative pitching moments and hinge moments were observed, indicating that the presence of a boundary layer control device at the flap to insure substantially complete flow turning was extremely advantageous.

It should be observed that the neutral position of the flapevator need not be identical for all flap positions, but may be programmed within a small angular range of approximately plus or minus five degrees with respect to the flap according to flap position. From this programmed neutral position, the pilot may superimpose an angular variation of approximately plus 20 degrees (clockwise in drawing) and minus 30 degrees (counter-clockwise in drawing). This arrangement permits to adjust very exactly the pitching moments of the complete structure at a constant value, which in this case is zero, throughout the flap deflection range with the flapevator at its programmed neutral. In addition, of course, the pilot superimposes flapevator deflection for control of the craft is desired.

In FIGURE 4, when the flap is retracted to position 64, then the airfoil becomes a conventional one with the cylinder housed completely within the wing in position 73. Since the cylinder may be segmented to insert cylinder support bracket 54, it can have a narrow cylinder gap, which gap serves also to allow retracted cylinder 73 to overlap bracket 51. Also, there is indicated a small cylinder door on the wing shown open in position 67 and closed in position 68.

In FIGURE 5, I show in perspective the flap bracket 51 also described in FIGURE 4. It should be observed that bracket 51 is thin because, when the cylinder and flap are retracted, the thin portion of bracket 51 is housed between the adjacent ends of the narrow cylinder gap at the cylinder's bracket support. Bracket portion 72 is outside the cylinder's periphery for all flap positions and thus it is made of a different cross section, and is used to support flap pivotal axis 51.

FIGURE 6 shows a wing, flap, and flapevator structure similar to that of FIGURE 4 except that in FIGURE 6 a blowing boundary layer control (B.L.C.) cylinder has been installed instead of the rotating cylinder of FIGURE 4. Also shown are some details of propeller thrust line and wing incidence. With attached slipstreams on the flap possible with blowing B.L.C. as is with a rotating cylinder, then the aerodynamic characteristics of the structure of FIGURE 6 are very similar to those of FIGURE 4. Specifically, there is shown a forward wing portion 75 having a flap bracket 76 which supports a flap 78 at pivotal spanwise axis 77. The flap has a blowing cylinder 93 which has a blowing slit 94 to blow B.L.C. air 95 tangentially to the flap and thus provides propeller slipstream turning for VTOL and STOL operation. This type of blowing cylinder at the leading edge of a flap and protruding above the flap is of the type described in my aforementioned application 48,038 and thus the flap is aerodynamically balanced. In adidtion, however, this flap 78 is provided with a flapevator 81 which can move with respect to the flap. For instance for flap position 79 it moves along arc 82 and for flap position 80 along arc 83. Thus its characteristics and mode of operation are similar to those described in connection to the flapevator of FIGURE 4. Wing 75 is shown with a lower door 86 which permits to extend the wing structure rearwards below the retracted flap to increase volume storage, torsional rigidity of the wing, and decrease the size of the flap bracket.

Also shown in FIGURE 6 are some details of wing incidence and thust line incidence which are generally applicable to deflected slipstream VTOL and STOL aircraft. It has been customary in the past to mount the wing with a large positive incidence of the order of 20 degrees in the fuselage of deflected slipstream VTOL, and the propeller axis at a negative incidence with respect to the wing. I have discovered that to improve turning angles near the ground or in "ground effect," and also to introduce a positive change of pitching moments due to thrust of the propeller, it is advantageous to install the thrust line with a positive incidence with respect to the wing. As shown in FIGURE 6, wing 75 supports nacelle 85 and has a wing chord line 90. The wing may be mounted with respect to a fuselage reference line 92 at approximately 12 degrees as shown by angle 91, or more, depending on the turning angle of the wing flap combination. The thrust line 88, however, should be with a positive angle 89 of approximately 10 degrees with respect to the wing chord and the propeller hub should be approximately level with, or slightly below, the plane of the wing.

It should be observed that in the structure of FIGURE 6 it is possible to substitute for the blowing cylinder 93 a suction cylinder of the type mentioned in my application 48,038, in which case the characteristics of the structure would remain substantially the same.

So far I have described the use of the flapevator on structures having aerodynamically balanced flaps and proportions such that substantial neutral stability was present in hover in the absence of tail controls.

The flapevator, however, can also be used to decrease hinge moments for large deflections, and to improve the pitch stability characteristics and/or control characteristics of wing flap combinations which do not have neutral stability or which do not use full aerodynamic balance on the flaps.

Consider the case of flap structures of the type shown in FIGURES 7 and 8. These structures will not exhibit neutral stability about a 35 percent wing chord. However, it is possible to use the flapevator to greatly decrease the pitching moments and hinge moment characteristics, by prescribing an S-shaped camber for the combination such that the pitching moments about the C.G. be a constant for all flap positions. For example, for 40 degree clockwise flap deflection the flapevator may be turned counterclockwise 7 degrees or more, and for 65 degrees clockwise flap deflection the flapevator may be turned counterclockwise 15 degrees or more. With such arrangements, providing that boundary layer control is used for the main flap and that the main flap is large and preferably of the order of 50 percent of the wing chord, then it is possible to have a constant pitching moment for all flap deflections.

With this condition, a decreased and constant pitch trim couple may be supplied by a conventional arrangement like tail jets in a VTOL (thus eliminating variation of net resultant lift force with tail jet forces) or a stabilizer in a STOL, and control may be provided either by additional tail jets for VTOL, by superimposed flapevator and conventional elevator deflections for STOL, or by both methods. Flapevator deflections would give the pilot an aerodynamic "feel" for his control judgment even when in hover for VTOL, or for very slow speeds in STOL. These types of structures are shown on FIGURES 7 and 8. The figures, in addition, are shown illustrative of typical configurations for VTOL and STOL maneuvers.

In FIGURE 7, I show a wing structure with my reversible camber flap of approximately 55 percent wing chord length and using for boundary layer control a rotating cylinder and a slot. Wing 100 is shown supporting a rotating cylinder 112 and flap 101 at fixed axis 111. The flap is deflected approximately 100 degress for a steep VTOL or STOL approach. The flapevator 102 is shown deflected in opposite direction to that of the flap. The wing is shown with a cylinder slot 110, a slot door 103 (on the flap's lower surface) and a nacelle 104 supporting a propeller 109. The wing has a small negative reference angle 106 with respect to the horizontal, but the path of the aircraft is shown by arrow 105 and remote relative airspeed 107 to be very steep. With small propeller thrusts, the relative airstream is changed in direction 108 which then determines the effective wing angle of attack.

With attached flap flows it becomes possible for the wing to develop a rearwardly and upwardly direction resultant force which enables to control the sinking rate and angle of descent in a satisfactory maneuver.

It can be seen in this figure that inclining the thrust line as suggested in FIGURE 6 would result in an improved leading edge flow condition for the wing in steep descents. Controlled steep descents of the type shown in FIGURE 7 are of importance because it is necessary for maneuvers in rough terrain and similar conditions. The aerodynamics of the structure enable to exchange the potential energy of the craft into energy in the surrounding atmosphere with greatly reduced pitch disturbances by virtue of the peculiar flap arrangement shown. A similar arrangement would be applicable also for tilt wing aircrafts in the same type of maneuver, which then would enable to perform steep approaches at greatly reduced wing tilt angles.

In FIGURE 7 there is shown also different flap position for steep approaches shown in dash lines 113. This position produces negative pitching moments but requires a less severe turning angle for the flow.

In FIGURE 8, I show a structure similar to that of FIGURE 7, except that it is shown in a transition from stationary to high speed flight at horizontal wing attitude. Specifically, there is shown wing 120 supporting a rotating cylinder 121 and flap 123 at common axis 120. The flap is shown deflected about 60 degrees with flapevator 124 deflected with respect to the flap and in the opposite direction by about 12 degrees. This condition has greatly decreased flap hinge moments and wing pitching moments and is useful also for STOL takeoff. As the flap is further retracted gradually to intermediate positions like 125, the flapevator should also be moved towards its neutral position like in 126, and finally for high speed flight the flap is in position 127 and the flapevator is neutral. The wing shows a high lift slot 132 ahead of the cylinder and a cylinder door 128 which may be displaced along arc 129 to any intermediate position to increase flow through the slot and to a final closed position 133 for high speed flight.

The wing also shows a center of gravity 134, a flap actuator 135 which is used to deflect the main flap and may be of conventional design, a nacelle 130, and a propeller thrust line 131 inclined upwards to the wing. Thus the propeller thrust line is located well below the center of gravity to provide a pitch up contribution in slow speed flight; yet, by locating the propeller hub close to the wing, a large proportion of slipstream flows over the wing to improve lift.

It should be observed that the type of boundary layer control in FIGURES 7 and 8, and in general in all other figures, could be substituted for suction or blowing without changing the advantages of the reversible camber flap.

Also areodynamically balanced reversible camber flaps of the type shown in FIGURES 4 and 6 could be used with the proportions of FIGURES 6 and 7 to further improve the pitch stability and control of the structures. Furthermore, the complete structures of FIGURES 4 and 6 may be deflected in the general positions shown in FIGURES 7 and 8 to perform the maneuvers mentioned in the latter figures.

Before describing the remaining figures, some additional applications of the flapevator type of structure will be discussed. Evidently, from item (d) in the description of FIGURE 4, it is evident that the flapevator itself may be used to deflect and retract the main flap if desired. Flap actuators may be eliminated in that case, or used as an alternate safety system to deflect the flap. An additional use of an auxiliary flap like the flapevator at the trailing edge of the main flap, is to increase the turning angle and turning efficiencies of a deflected slipstream VTOL and STOL aircraft. For this application, however, the auxiliary flap is deflected in the same direction (positive) with respect to the flap as the flap is deflected with respect to the wing. This arrangement is shown in FIGURE 9. Thus, instead of an S-shaped camber line, the camber line has only one type of curvature. The turning angle is defined as the angle between the propeller axis and the direction of the resultant airplane force (excluding weight) for the case of interest, for example hover. The turning efficiency is defined as the ratio of the resultant force to the propeller thrust for the case of interest.

Positive deflections of the auxiliary flap produce an increment of flap hinge moment and negative wing pitching moment which is undesirable in itself, but this may be compensated by the increment of turning angles and turning efficiencies.

For the particular case of structures of the type of FIGURES 4 and 6, because of their excellent pitch characteristics, it is possible to use the auxiliary flap with positive deflections and still obtain very satisfactory pitch characteristics similar to those of FIGURES 7 and 8. Further, for structures of the type of FIGURES 4 and 6 with the propeller thrust line located below the wing at approximately 10 or 20 percent of the propeller diameter, it is possible to obtain substantial neutral stability in hover even though the auxiliary surface has positive deflections of the order of 20 degrees. Such an arrangement may be used as a compromise between optimum turning efficiencies and turning angles with pitch stability and control characteristics.

It should be observed that in the drawings, the auxiliary flap or flapevator has been shown to be a plain flap (for instance FIGURE 7) or a slotted flap (for instance FIGURE 6). The flapevator could also be arranged to retract into the main flap like a Fowler flap retracts into a wing. Since a Fowler type flap is well known in the art, such an installation for a flapevator in a flap is not shown in the drawings. The main advantage of a Fowler type flapevator would be to decrease the surface area of the flap in the flapevator-retracted high speed condition. However, there would be an effective change of wing chord with flapevator extension that would be unfavorable for pitch stability considerations.

In FIGURE 9, I show a device to control my flapevator from a wing. This figure is illustrative of one type of mechanism that can be used; the mechanical problems of such connections are relatively simple and other types of mechanisms known for conventional variable camber double slotted flaps, or folding wings can be used. Specifically, FIGURE 9 shows a wing 140 having a flap bracket 141 supporting flap 143 at flap spanwise pivotal axis 142. The flap has a rotating cylinder 145 at its leading edge, and flapevator 144 at its trailing edge. The wing is shown supporting a spanwise torque tube 150 with bellcrank 147; bellcrank 147 actuates flapevator 144 by means of cables 148 and 151 which pass through pivot axis 142 to flapevator horn 146. As connected in the drawing, counterclockwise motion of bellcrank 147 results in clockwise motion of flapevator 144. Torque tube 150 may be connected directly to the pilot's control stick 152 to provide pitch control if desired. Alternately, torque tube may be connected to a cam device (not shown) linked to the flap's angular position or flap actuator to program the position of flapevator 144 with respect to the flap. As shown in the figure, forward movement of stick 152 produces nose down pitching couples as is normal for aircraft. It should be observed that torque tube 150 could be replaced by cable controls of the type used for normal ailerons. With reference to the cable control lines between the bellcrank and the flapevator, they can be arranged to pass through the flap's pivot axis directly. An alternate arrangement is shown in a similar mechanism for aileron cables in folding wings, of FIGURE 1, U.S. Patent 2,509,272 of May 13, 1950. Other known flap and aileron control systems for double slotted flaps, droop ailerons, and ailerons in folding wings may be adapted for the flapevator.

In FIGURE 9, I also show a small air tube 149 fixed to the flap ahead of the cylinder and at a spanwise location coincident with the cylinder's bracket support (bracket support not shown). This tube blows air 153 over the cylinder gap at the bracket to prevent flow deterioration over the cylinder support bracket. The location and aerodynamic effects of this blowing device is better illustrated in FIGURE 10 in which an alternate air tube or nozzle is used.

Specifically, FIGURE 10 shows in perspective a portion of a wing in the vicinity of the cylinder bracket support. There is shown a wing upper surface 155, a rotating cylinder 156 rotating about axis 157 in counterclockwise direction, a flap 158 and cylinder support bracket 159. Normally, bracket 159 because it does not rotate like the cylinder, produces a flow deterioration spreading on the flap as shown in dash lines 160, thereby reducing lift. In order to correct this local flow deterioration, there is installed an air nozzle 161 at the end of a tube (tube not shown); in this case the nozzle is supported by the wing. The nozzle discharges air 162 near the top of the cylinder tangentially to it, which air overcomes flow deterioration 160 by penetrating this area by path 163, whereby lift gains are obtained. In wind tunnel tests in which one cylinder support bracket was used over a 7-foot span, this type blowing nozzle has produced increments of lift coefficient of the order of 0.20, even though the nozzle was not considered to be of the optimum configuration. This nozzle arrangement is considered to be of particular advantage for the case of swept rotating cylinders used in swept wings, since in that case the usual cylinder end discs would produce prohibitively large high-speed drag, and without a blowing nozzle the adverse effects of the gaps on high lift would be augmented due to the spanwise flow component due to sweep.

As an alternate arrangement to that shown in FIGURE 10, a suction chamber can be installed at the stationary bearing support between adjacent ends of the rotating cylinder. Wind tunnel experiments were made with the suction arrangement, but the improvements were found to be less than those obtained with the blowing nozzle.

Various further modifications and alterations from those described hereinabove can obviously be made without departing from the spirit of this invention, and the foregoing are to be considered purely as exemplary applications thereof. The actual scope of the invention is to be indicated by reference to the appended claims.

I claim:

1. In an aircraft wing having a cylinder mounted thereon for rotation about an axis transversed to the direction of flight of said wing with an axially extending portion of said cylinder exposed to the path of air flow over said wing, the improved means for mounting said cylinder on said wing comprising: a bracket mounted on said wing adjacent to an axially selected area of said cylinder with said cylinder rotatably mounted in said bracket, and an air supply tube mounted adjacent to said axially selected area of said cylinder with a discharge nozzle mounted to discharge air substantially tangentially of said cylinder adjacent to said bracket.

2. A deflected slipstream high lift and pitch control propeller-wing-flap system for vertical and short take off aircraft adapted to be powered by a gas turbine engine comprising: a wing; a propeller which produces slipstream air flow on said wing having a slipstream air pressure during high lift flight of a large and substantial magnitude which exists regardless of aircraft translation and remains at a large and substantial magnitude when, outside of said slipstream, small air pressure exists on said aircraft due to aircraft translation, with said small air pressure being insufficient to provide adequate pitch control forces; a main flap mounted on the trailing edge of said wing having a large flap chord with said flap deflected downward by a large angle to a high lift position which directs said slipstream flow downwards to provide a large and substantial deflected slipstream lift contribution to the total lift of said aircraft when said aircraft experiences said small air pressures outside said slipstream; with said main flap in said deflected position having an upper flap surface portion which is substantially immediately adjacent to the upper surface of said wing and remote from the lower surface of said wing; boundary layer control means mounted between said flap and wing and adjacent to the upper surfaces of said flap and of said wing to permit deflection of said main flap with attached slipstream flows to angles at least as great as approximately 60 degrees downwards; and means for modulating during high lift flight the pitch attitude of said aircraft, separate from any roll control system of said aircraft in said high lift flight, including an auxiliary flap mounted on the trailing edge of said main flap immersed in said slipstream of said propeller, with said auxiliary flap experiencing said large and substantial air pressures of said slipstream, said auxiliary flap being mounted for angular movement with respect to said flap about an auxiliary flap neutral position trailing said main flap to provide changes in the pitching couples of said wing and said aircraft by auxiliary flap motion in a direction opposite to the angular deflection of said main flap to produce a pitch up couple and in the direction of said deflection of said main flap to produce a pitch down couple, with said couples existing regardless of aircraft translational speeds at which air pressures due to translation are insufficient to provide adequate pitch control forces.

3. A deflected slipstream high lift and pitch stability and control propeller-wing-boundary layer control flap system for vertical and short take off aircraft comprising: a wing extending in a direction approximately perpendicular to the high speed direction of flight of said aircraft having an upper surface and an undersurface; propeller means which produce a slipstream air flow on said wing having slipstream air pressures during high lift flight of a large and substantial magnitude which exist regardless of aircraft translation and remains at a large and substantial value when, outside of said slipstream, small air pressures exist on said aircraft due to aircraft translation, with said small air pressures being insufficient to provide lift from said wing for level flight of said aircraft and being insufficient to provide adequate pitch control forces to control said aircraft; a main flap mounted on the trailing edge of said wing having a flap chord at least as great as approximately fifty percent of the chord of said wing with said flap having an upper surface and a main flap leading edge portion with said main flap mounted for movement to high lift position inclined to said wing by an angle at least as great as approximately sixty degrees with said leading edge portion of said main flap protruding substantially above said upper surface of said wing and with the principal portion of said flap located below said wing; boundary layer control means mounted between said flap and said wing adjacent to said main flap leading edge portion and remote from said undersurface of said wing to secure attached slipstream flows round said protruding leading edge and into the upper surface of said flap in said high lift position, and consequently securing a greatly decreased flap hinge moment and greatly reduced wing pitching moment due to flap deflection; and an auxiliary flap mounted on the trailing edge of said main flap immersed in said slipstream of said propeller means, with said auxiliary flap experiencing said large and substantial air pressures of said slipstream, said auxiliary flap being mounted for angular movement with respect to said main flap to alter said greatly reduced wing pitching moment by auxiliary flap motion in a direction opposite to the angular deflection of said main flap to provide a pitch up couple and in the same direction of said angular deflection of said main flap to provide a pitch down couple, with said couples existing regardless of aircraft translational speed at which air pressures due to translation are insufficient to provide adequate pitch control forces.

4. A boundary layer control high lift flap for wings having greatly reduced flap hinge moments and pitching moments comprising: a wing having an upper surface; a main trailing edge flap mounted on said wing and having a main flap leading edge portion and a main flap upper surface, with said main flap having said upper flap surface and leading edge portion substantially immediately adjacent to the upper surface of said wing with said main flap being mounted for movement to a downwardly inclined high lift position by a large angle at least as great as approximately fifty degrees, boundary layer control means contiguous to said flap leading edge and said wing upper surface to secure attached high lift fluid flow field downwardly on top of said upper surface of said flap at said large angles; an auxiliary flap for modulating the pitching moments of said wing and the hinge moments of said main flap mounted on the trailing edge of said main flap for movement with respect to said main flap between a high speed position in which the surfaces of said auxiliary flap are approximately parallel to the surfaces of said main flap adjacent to said auxiliary flap when said main flap is in a retracted main flap position trailing said wing for high speed flight, to a slow speed position of decreased main flap hinge movement and wing pitching moment in which, when said main flap is deflected downwards by said large angles, said auxiliary flap is permanently inclined to said main flap at a fixed upward angular relationship with said auxiliary flap turned upwards at negative angle from said main flap to decrease the overall effective camber of said wing and main flap in said high lift position and to redirect said attached high lift fluid flow field which were secured by said boundary layer control means from said downwardly direction towards an upwardly direction.

5. The structure of claim 4 further characterized in that said negative angle between said auxiliary flap and said main flap is variable with varying main flap angular deflection but remains fixed for any stationary main flap position, with said negative angle being of the order of seven degrees for intermediate main flap deflections of the order of twenty degrees and of the order of fifteen degrees for large main flap deflections of the order of sixty degrees.

6. An aircraft incorporating the system of claim 3 with said aircraft having a center of gravity located at approximately thirty-five percent of the average chord of said wing.

References Cited in the file of this patent

UNITED STATES PATENTS

| 2,130,958 | Kramer | Sept. 20, 1938 |
| 2,207,453 | Blume | July 9, 1940 |
| 3,016,213 | Griswold | Jan. 9, 1962 |

FOREIGN PATENTS

| 550,713 | Great Britain | Jan. 20, 1943 |